US009152192B2

(12) United States Patent
Martin-Otto et al.

(10) Patent No.: US 9,152,192 B2
(45) Date of Patent: Oct. 6, 2015

(54) POWER SUPPLY AND POWER CORD FOR MAX POWER SETTING

(75) Inventors: William Fred Martin-Otto, Apex, NC (US); Albert Vincent Makley, Raleigh, NC (US); Russell Alan Resnick, Raleigh, NC (US); Timothy Samuel Farrow, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 997 days.

(21) Appl. No.: 11/960,504

(22) Filed: Dec. 19, 2007

(65) Prior Publication Data

US 2009/0160664 A1 Jun. 25, 2009

(51) Int. Cl.
*G08B 21/00* (2006.01)
*G06F 1/26* (2006.01)
*H04L 1/00* (2006.01)
*G06K 1/00* (2006.01)

(52) U.S. Cl.
CPC .. *G06F 1/26* (2013.01); *G06K 1/00* (2013.01); *H04L 1/00* (2013.01)

(58) Field of Classification Search
CPC .................................. H04L 1/00; G06K 1/00
USPC ................................................. 340/657, 572
See application file for complete search history.

(56) References Cited

U.S. PATENT DOCUMENTS

| 4,108,522 | A  | * | 8/1978  | Favale .......................... 439/357 |
| 6,774,803 | B1 | * | 8/2004  | Tiffin ............................ 340/638 |
| 2002/0008623 | A1 | * | 1/2002  | Garber et al. .............. 340/572.1 |
| 2005/0208344 | A1 | * | 9/2005  | Tan .................................. 429/7 |
| 2007/0238341 | A1 | * | 10/2007 | So .................................. 439/172 |
| 2007/0253149 | A1 | * | 11/2007 | Mohn ........................... 361/600 |
| 2008/0058999 | A1 | * | 3/2008  | Khodorkovsky et al. ..... 700/297 |
| 2008/0100467 | A1 | * | 5/2008  | Downie et al. ............. 340/686.2 |

* cited by examiner

*Primary Examiner* — Shirley Lu
(74) *Attorney, Agent, or Firm* — Schwegman Lundberg & Woessner, P.A.

(57) ABSTRACT

Apparatus, methods, and systems are disclosed for a power supply adapted to receive power from an outlet, the power input having a property, such as amperage, frequency or voltage. An indicator is provided on the connector to the power cord to indicate a value for the property to the power supply, wherein the power supply adapts to the value for the property. By providing an indication of the property the system is capable of reducing functionality to meet the capabilities of the power supply. A power cord may be provided with a male plug at one end capable of being inserted into a socket with a minimum value for a property, and the other end of the power cord may have a connector with an indicator to identify the minimum value for the power cord.

20 Claims, 4 Drawing Sheets

# POWER SUPPLY AND POWER CORD FOR MAX POWER SETTING

BACKGROUND

Power supplies for computer systems are often designed and developed for the power requirements of the computer system. In addition the local power capabilities are also taken into consideration. For example, for a larger system the computer may need to operate at 115 volts at 60 hertz and have a supply of 20 amperes (amps). However, most power outlets in homes in the United States and Canada provide 115 volts at 15 amps. If the system were to try to draw 20 amps, a fuse may blow or a circuit breaker may trip.

In addition European countries, Asian countries and others have varying power capabilities. For example, in Europe it is common to have an outlet supply 220 voltage power at 50 Hertz. It is common for power supplies to be developed so they are capable of sensing the voltage and frequency of the power supplied by the outlet and adjust accordingly. It is not a simple matter to sense the available current for a system for the power supply based on the provided power. If the amperage available to the power supply is not known, the power requirements must be developed for a worst case scenario. For example, if the amperage available is not known, the power supply may be limited to 15 amps. As an alternative the power requirements for the power supply may need to be specified, potentially limiting the application of the system. For example a power supply that requires 20 amps, may not be used in locations that only have 15 amp power outlets without the danger of fire, blown fuses or tripped circuit breakers.

DETAILED DESCRIPTION

Figure 1:
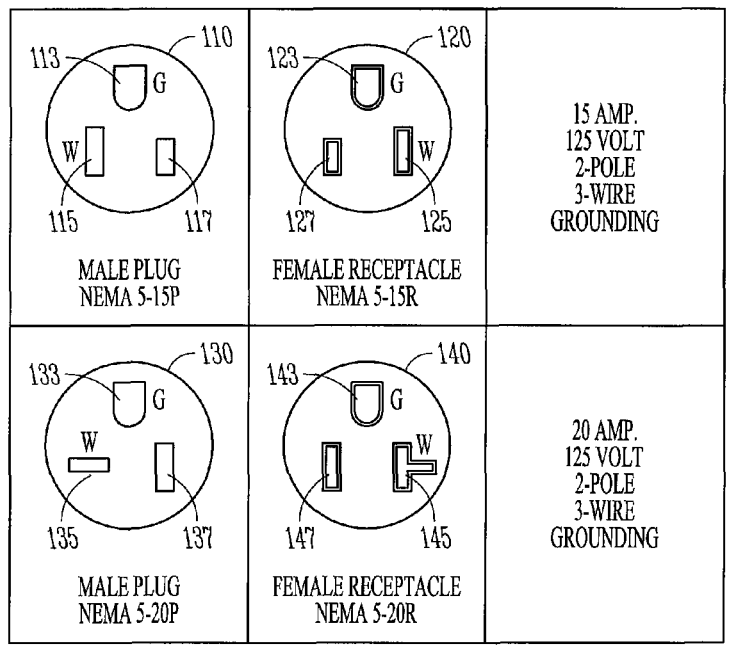
FIG. 1 illustrates prior art electrical outlets available in the United States of America.

FIG. 1 illustrates electrical outlets available in the United States of America (U.S.). The outlets provide differing properties for the power supplied, including differing voltages, amperage and frequency. Outlets in the U.S. are configured based on the parameter for the value of amperage available to allow for manufactures to use different male connectors for different amperage requirements. For example, a 20 amp male connector will not fit into a 15 amp outlet or female receptacle. Male Plug 110 is for use with a device that requires 115 volts and 15 amps or less to operate. The blade 115 is longer than blade 117. A ground plug 113 is attached for most configurations; however for 15 amp outlets it may be optional. Blade 115 is positioned vertically or parallel to blade 117. An outlet receptacle 120 is designed to receive male plug 110 and mirrors the blades 113, 115, and 117. Male plug 130 is for use with a device that requires 115 volts and a 20 amp outlet. The blades 137 and 133 are similar to those of male plug 110 and may be inserted into receiver 147 and 143 respectively. The main difference is that blade 135 is horizontal or perpendicular to blade 137. Because blade 135 is perpendicular, it is not possible to plug male plug 130 into receptacle 120. Receptacle 140 is similar to receptacle 120, except that receiver 145 is T-shaped and adapted to receive both blades 115 and 135. These configurations allow receptacle 140 to provide receive both male plug 110 and male plug 130. While male plug 130 would not be received by receptacle 120. In this manner it is possible to have a device designed to draw greater than 15 amps of current be limited to outlets that may provide 20 amps by having a plug designed to only be plugged into a 20 amp receptacle. By modifying the plug design other countries in a similar manner regulate the parameters of power drawn by a device.

Figure 2A:
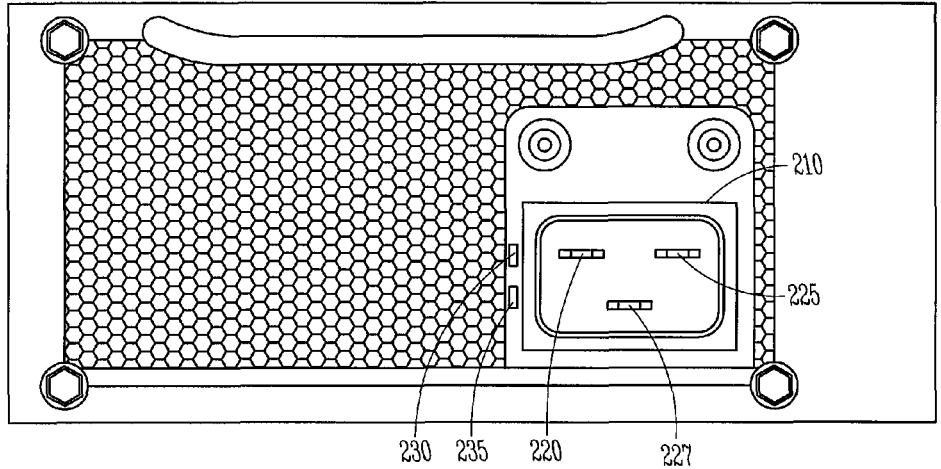
FIG. 2A is a power input for a system according to an example embodiment.
Figure 2A:
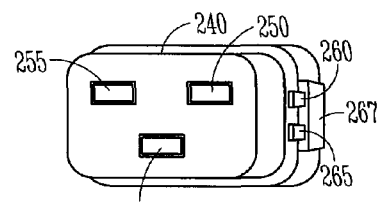

FIG. 2A is a power input for a system 200 according to an example embodiment. System 200 incorporates a power receptacle 210 to receive a power input. The power receptacle may have blades 220, 225 and 227 to receive power from a power cord that may be connected to a power outlet in a wall. Receptacle blade 220 and 225 may receive the alternating current input and blade 227 may be a ground. To identify the type and amperage of the input power, two female sockets 230 and 235 are provided. When a bridge from socket 230 to 235 is provided, the bridging may indicate to the power supply (not shown) in system 200 that a power cord or line cord is adapted to be connected only to a 20 amp receptacle.

Connector 240 may be adapted to couple with power receptacle 210. Sockets 250 and 255 may be adapted to couple with blades 220 and 225 respectively of power receptacle 210. Socket 253 may be adapted to couple with blade 227.

Figure 2B:
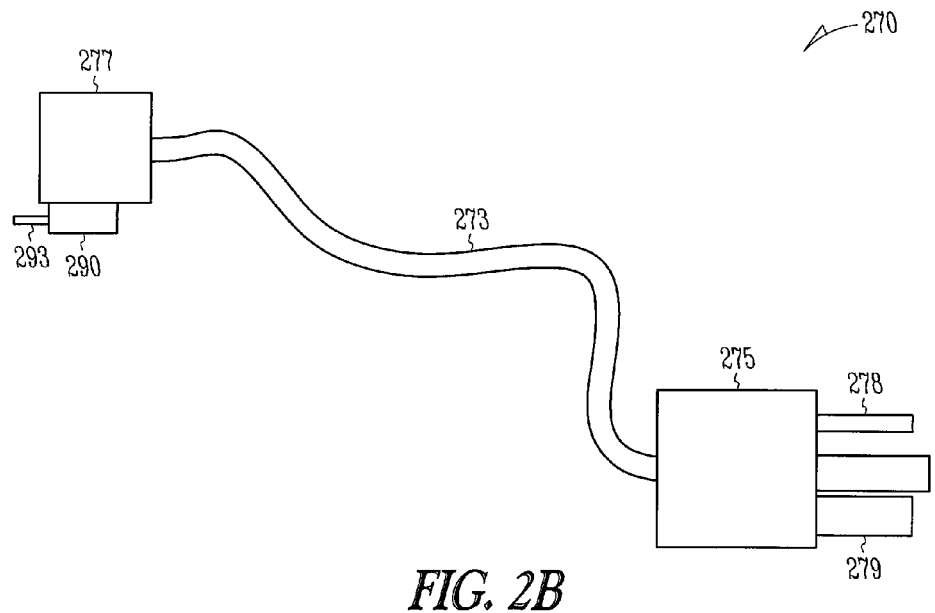
FIG. 2B is a top view of a power cord for a system according to an example embodiment.

FIG. 2B is top view of a power cord for a system according to an example embodiment. Power cord 270 is adapted to provide 20 amp power to power receptacle 210. Connector 277 may be attached to a power cord 273 which may be attached to a male plug 275, which is similar to male plug 130 of FIG. 1. Blade 279 is horizontal or perpendicular to blade 278. As stated earlier, male plug 275 may only be connected to a 20 amp receptacle such as receptacle 140 of FIG. 1. Male plug 275 is connected to connector 277 via line 273 capable of transmitting 20 amps of current. Connector 277 includes indicator 290 which is a bridge to bridge sockets 230 and 235 with blades 260 and 265, due to the view only one blade 293 of the bridge is shown. In this manner indicator 290, indicates that a 20 amp power cord is being utilized and 20 amps of current is available. While in this embodiment the bridge 290 indicates 20 amps of current are available, the alternative embodiment may also be available where a bridge of sockets 230 and 235 would indicate that only 15 amps of current was available.

Figure 2C:
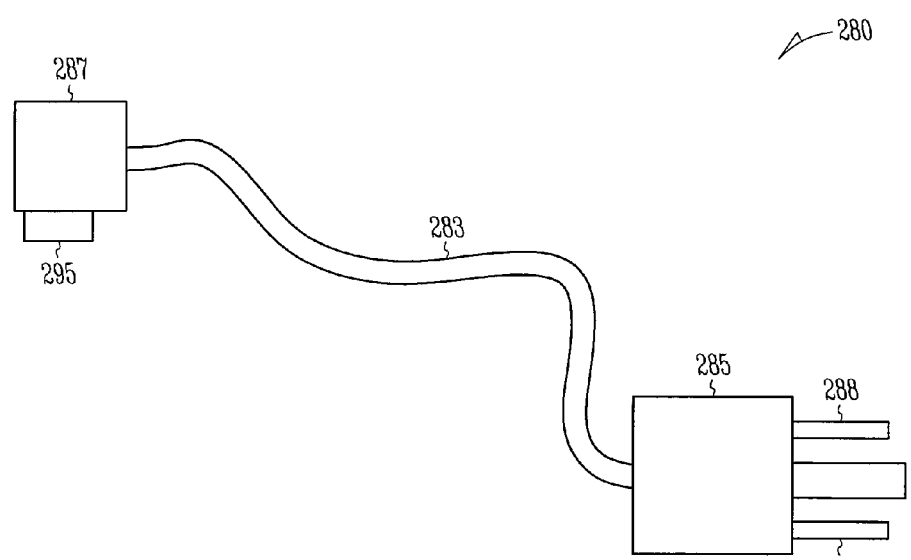
FIG. 2C is a top view of a power cord for a system according to an example embodiment.

FIG. 2C is a top view of a power cord for a system according to an example embodiment. Power cord 280 may be utilized with a 15 amp receptacle such as receptacle 120 of FIG. 1. Power cord 280 is adapted to receive up to 15 amps of current. Power cord 280 has a male plug 285 similar to that of male plug 110 of FIG. 1. Male plug 285 comprises blade 289 which is parallel to blade 288. Male plug 285 is connected to connector 287 with indicator 295. Indicator 295 does not include a bridge similar to indicator 290 and therefore sockets 230 and 235 will not be bridged. This will indicate to the power supply that only 15 amps of current are available.

The indicator is an active indicator to indicate the value of a parameter of the power supplied to the system. In addition to sensing a bridging or shorting of sockets 230 and 235, the indicator may be any of a number of systems to indicate the value of parameters of the supplied voltage. For example, a transponder or RFID tag may be used as the indicator and have encoded in the signal the value of multiple parameters of the supplied voltage. In addition a magnet in the connector may be used to indicate the value of a parameter is above or below a threshold. In one example, the plug at one end of a power cord may be adapted to be inserted into a receptacle for a power outlet. As shown in FIG. 1 the configuration of the receptacle may be indicative of the voltage, frequency and rated amperage of the outlet. The plug and connector may be paired on a power cord such that the connector incorporates an indicator that indicates the values for the parameters of power from an outlet that the plug is adapted to couple with.

Figure 3:
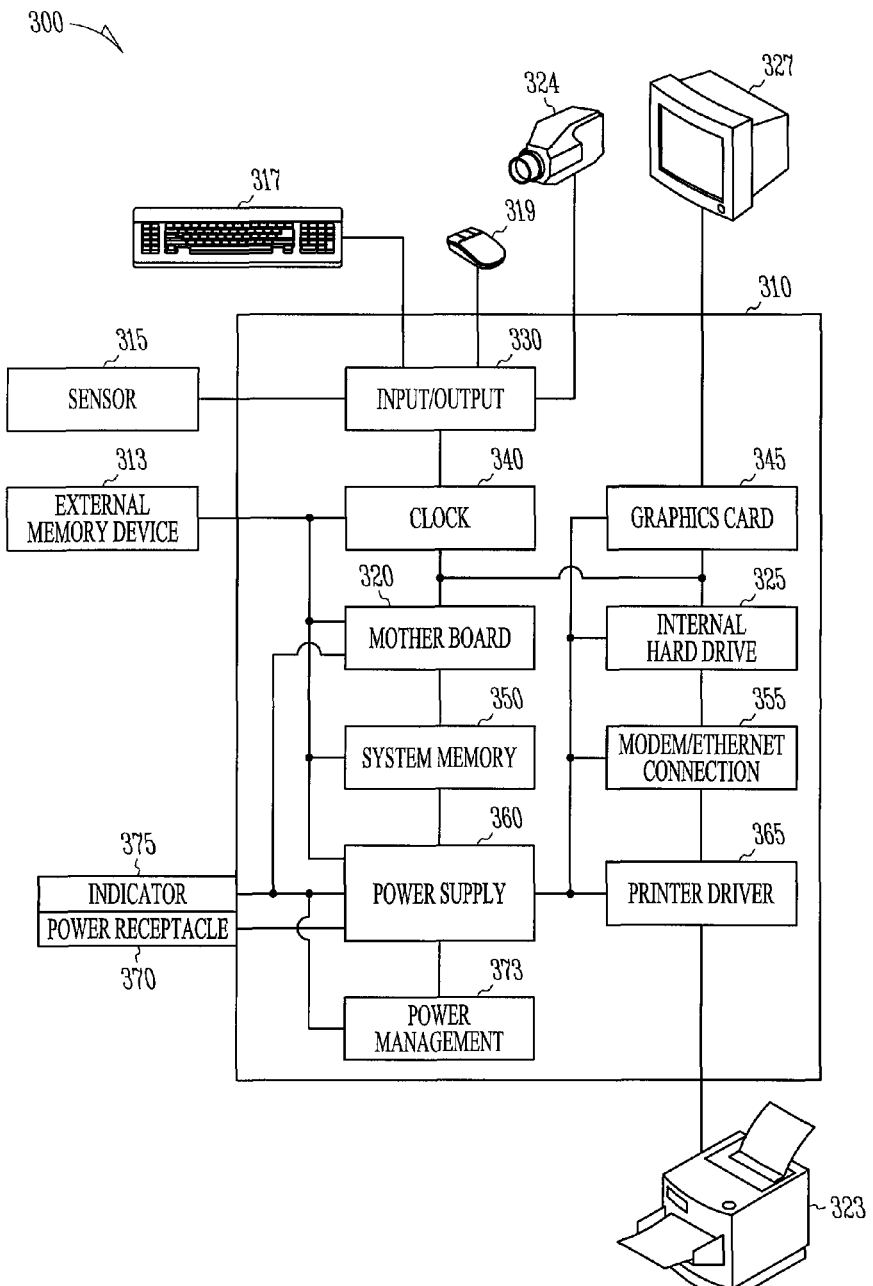
FIG. 3 is a representation of a system according to an example embodiment.

FIG. 3 is a representation of a system incorporating an example embodiment. System 300 may include a computer 310 having a mother board 320, an input/output 330, a clock 340, a graphics card 345, an internal hard drive 325, a system memory 350, a modem and/or Ethernet connection 355, a power supply 360 and a print driver 365. The computer may be connected to an external memory device 313, a sensor network 315, a keyboard 317, a mouse 319, a printer 323, a camera 324 and a monitor 327. The computer may receive power from a power receptacle 370, incorporating an indicator 375, such as the system 200 illustrated in FIG. 2.

The power supply 360 may be capable of operating at various levels based on the parameters of the power supplied. Those parameters may include amperage, voltage or frequency. When the value of the parameter is above a threshold the power supply may operate at fall capacity, when the value is below a threshold, the power supply may operate at a reduced capacity. For example, for power supply 360 the parameter may be amperage and the threshold may be approximately 20 amps. Therefore, when the power input may operate at 20 amps the power supply will operate at full capacity or at a reduced performance level with a supply of 15 amps. Indicator 375 may indicate whether the power supplied is from a 15 amp supply or a 20 amp supply based on the indicator from the connector such as connector 240 of FIG. 2.

When a 20 amp supply is provided, the power supply will operate at a performance level that permits increased functionality over operation when a 15 amp supply is provided. When indicator 375, indicates a 15 amp supply is being provided, the power supply, or the power management system 373 may indicate to the computer 310 or mother board 360, the limitation of power capabilities. When the limitations are present, functionality of the computer 310 may be restricted or external peripherals such as sensor 315 or camera 324 may be restricted or eliminated. In one example, the graphics card 345 may be disabled, the clock 340 may run at a reduced speed, the speed of the I/O 330 may also be reduced, or the bandwidth of the modem/Ethernet connection 355 may be reduced.

Figure 4:
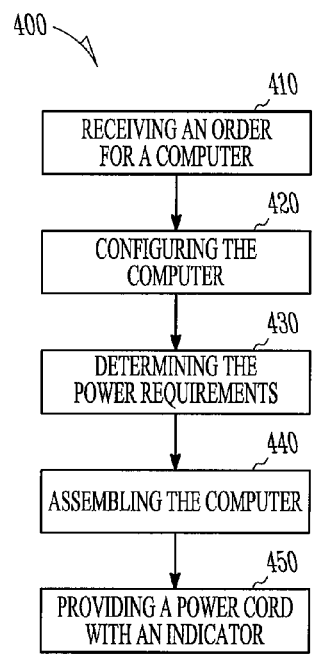
FIG. 4 is a method for configuring a computer and power supply.

FIG. 4 is a method for configuring a computer and power supply. The method 400 may include activity 410 to receive a request for a computer having certain characteristics or desires. For example a customer may request a computer through a sales outlet, online or by other means. Activity 420 may be to configure the computer. The configuration may be set by the customer or by the supplier. The configuration may be a simple computer system with limited power usage requirements. In some instances the configuration may be for a computer that requires significant resources to operate. For example, a system that requires a high end graphics card, significant memory, or a high clock speed, may require more power than the simple computer system. Activity 430 may be to determine the power requirements for the computer. When a high power system is configured, it may be that the power supply needs to run at a high capacity. In this case the power supply may not meet the power requirements for the computer when limited to a 15 amp power source. Once the power requirements have been determined activity 440 may be to assemble the computer. In some cases it may be advantageous to utilize a power supply that is capable of running with either a 15 amp supply or a 20 amp supply. In this case it is important to be able to indicate the amount of amperage available. Activity 450 may be to provide a power cord with an indicator of the level of amperage it is rated for. For example, if the system had a specification requiring 15 amps of power, a plug, similar to male plug 110 of FIG. 1 may be supplied at one end of a power cord and a connector without a bridge may be connected to the other end of the power cord. Since the sockets 230 and 235 would not be bridged, this may indicate that a 15 amp outlet is being utilized. If a 20 amp power cord was requested for a high power computer system, a male plug, such as male plug 130 of FIG. 1 may be attached to one end of a power cord, and a connector with pins 260 and 265 forming bridge 267 may be utilized to indicate that a 20 amp outlet is being utilized. In addition to supplying the 20 amp power cord, it may be possible to supply the 15 amp power cord. In this manner if only 15 amp outlets were available, a 15 amp power cord may be supplied and the system would be aware of the amperage the power supply may draw and reduce functionality of the computer.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. The above description and figures illustrate embodiments of the invention to enable those skilled in the art to practice the embodiments of the invention. Thus the following claims are hereby incorporated into the Detailed Description, with each claim standing on its own as a separate embodiment.

What is claimed is:

1. An apparatus comprising:
a power supply which receives a power input from a power cord, the power input having a property, wherein the property is a value of a current;
a power receptacle coupled to the power supply which connects to the power cord and receives the power input from the power cord, the power receptacle including four or more sockets, two sockets to receive alternating current from the power cord, one socket to receive a ground signal from the power cord, and one or more sockets that, in response to being connected to the power cord, provide a first signal to the power supply; and
wherein the power supply adapts to the value for the property based on the signal such that a first current is supplied by the power supply in response to the first signal being received at the power supply, and wherein a different current is supplied by the power supply in response to a second different signal.

2. The apparatus of claim 1, further comprising a device coupled to receive power from the power supply, wherein in response to the value for the property being below a threshold, a function in the device is reduced based on the signal.

3. The apparatus of claim 2, wherein the function is a graphics card.

4. The apparatus of claim 2, wherein the function is a clock speed.

5. The apparatus of claim 2, wherein the function is system memory speed.

6. The apparatus of claim 1, further comprising a transponder coupled to the power cord to provide the first and second signals.

7. The apparatus of claim 1, wherein the power receptacle includes five sockets, the one or more sockets includes two sockets, and wherein the power receptacle further comprises a bridge which shorts the sockets in response to the two sockets contacting the bridge.

8. The apparatus of claim 7, wherein the second signal is provided to the power supply in response to the two sockets not being connected to the bridge.

9. The apparatus of claim 8, wherein the power supply provides a second, lower magnitude current in response to the second signal being received at the power supply.

10. The apparatus of claim 1, further comprising a magnet coupled to the power cord to provide the first and second signals.

11. The apparatus of claim 1, wherein the second signal includes the first signal.

12. The apparatus of claim 1, wherein the second signal is an open.

13. A system comprising:
a computer having a power supply and a power receptacle, the power supply which receives a power input via the power receptacle, the power input having a property, wherein the property is a value of a current;
a power cord adapted to supply the power input, the power cord having an indicator, to provide a signal representative of the value of the property of the power input;
wherein the power receptacle is coupled to the power supply, connects to the power cord, and receives the power input from the power cord, the power receptacle including four or more sockets, two sockets to receive alternating current from the power cord, one socket to receive a ground signal from the power cord, and one or more sockets that, in response to being connected to the power cord, provide a first signal to the power supply; and
wherein the power supply adapts to the value for the property based on the signal such that a first current is supplied by the power supply in response to the first signal being received at the power supply, and wherein a different current is supplied by the power supply in response to a second different signal.

14. The system of claim 13, wherein, in response to determining the value of the current is below a threshold, the computer reduces functions based on the signal.

15. The system of claim 14, wherein the computer comprises a graphics card, and the graphics card has reduced functionality in response to the computer determining the value of the current is below a threshold.

16. The system of claim 15, wherein the threshold is 20 amperes.

17. The system of claim 13, wherein the power receptacle includes five sockets, the one or more sockets includes two sockets, and wherein the power receptacle further comprises a bridge which shorts the sockets in response to the two sockets contacting the bridge and provides the first signal to the power supply.

18. The system of claim 17, wherein the second signal is provided to the power supply in response to the two sockets not being connected to the bridge and wherein the power supply provides a second, lower magnitude current in response to the second signal being received at the power supply.

19. A method comprising:
receiving, from a power cord and at a power receptacle coupled to a power supply, a power input from a power cord, the power input having a property, wherein the property is a value of a current, the power receptacle including four or more sockets, two sockets to receive alternating current from the power cord, one socket to receive a ground signal from the power cord, and one or more sockets that, in response to being connected to the power cord, provide a first signal to the power supply;
receiving, at the power supply, the first signal;
determining the value for the property of the power input based on the first signal; and
adjusting the power supply to the value for the property based on the first signal such that a first current is supplied by the power supply in response to the first signal being received at the power supply, and wherein a different current is supplied by the power supply in response to a second different signal.

20. The method of claim 19, wherein the receptacle includes five sockets and the power cord includes a bridge, and wherein the first signal is provided to the power supply in response to two of the five sockets being shorted through the bridge, the method further comprising:
providing a second signal to the power supply in response to the two sockets not being shorted through the bridge, wherein the power supply provides a second, lower magnitude current in response to the second signal being received at the power supply.

* * * * *